UNITED STATES PATENT OFFICE.

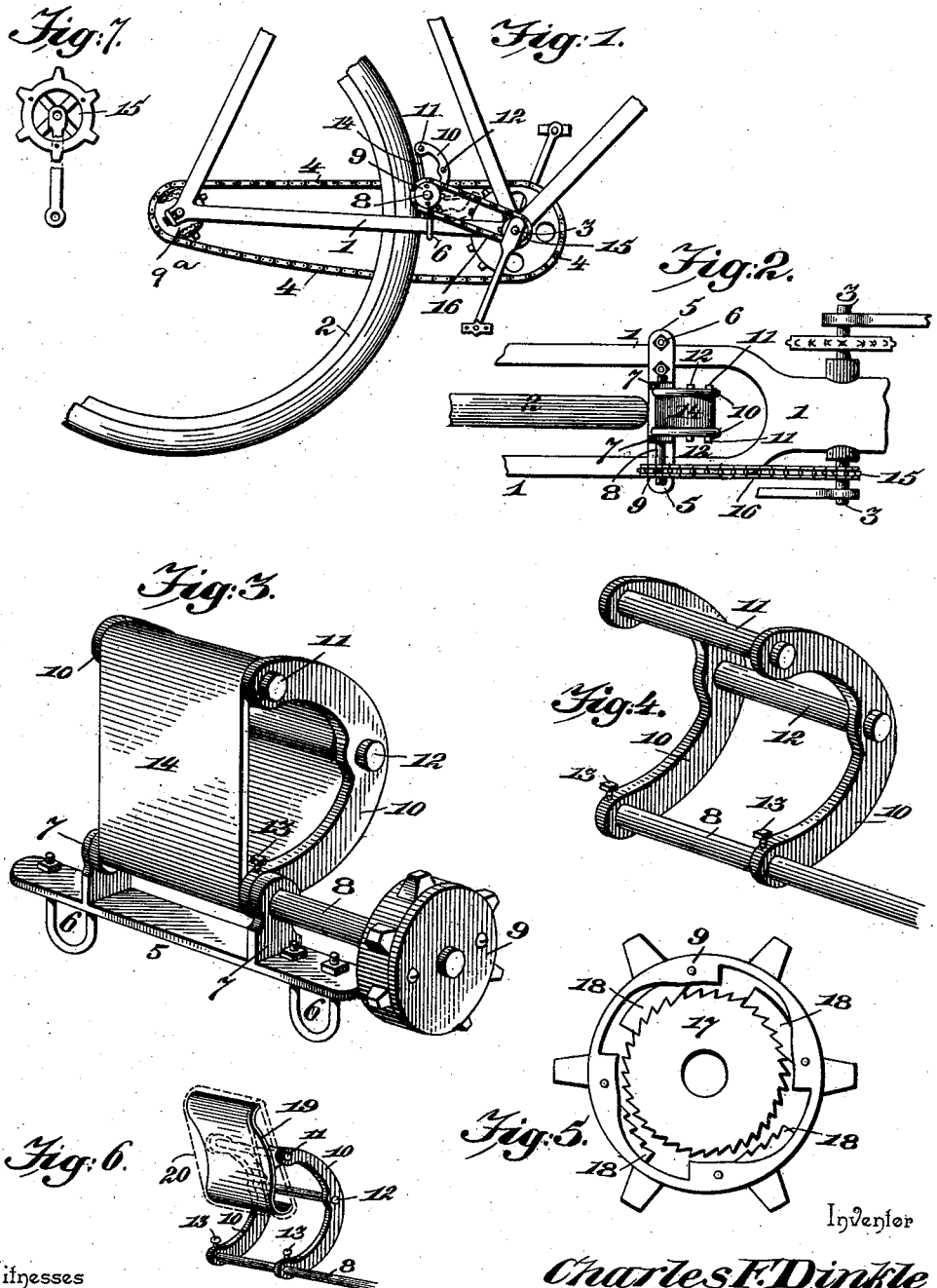

CHARLES FREDERICK DINKLE, OF CARLISLE, PENNSYLVANIA.

BACK-PEDALING BRAKE.

SPECIFICATION forming part of Letters Patent No. 603,265, dated May 3, 1898.

Application filed February 12, 1897. Serial No. 623,146. (No model.)

*To all whom it may concern:*

Be it known that I, CHARLES FREDERICK DINKLE, a citizen of the United States, residing at Carlisle, in the county of Cumberland and State of Pennsylvania, have invented a new and useful Automatic Bicycle-Brake, of which the following is a specification.

This invention relates to that class of brakes applied to bicycles and like machines which are set upon applying a back pressure upon the pedals and which are released when moving the pedals forward to again impart a propelling movement to the machine.

A salient feature of the improvement is to take the force directly from the pedal or crank shaft without interfering with the drive-chain or other means employed for transmitting motion from the crank-shaft to the drive-wheel, thereby making the brake mechanism independent of the propelling mechanism, whereby it is rendered more certain and definite in its action and enables the brake to be set with a degree of force proportionate to the back pressure applied to the pedals.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a portion of a bicycle, showing the application of the improved brake. Fig. 2 is a detail view in plan elevation. Fig. 3 is a perspective view of the brake. Fig. 4 is a detail view in perspective of the brake-frame. Fig. 5 is a detail view of the sprocket-wheel mounted upon the rock-shaft and showing the clutch mechanism for setting the brake on the application of back pressure upon the pedals. Fig. 6 is a modified form of brake. Fig. 7 is a detail view showing the sprocket for setting the brake secured directly to the crank.

Corresponding and like parts are referred to in the following description and indicated in the several views of the drawings by the same reference characters.

The portion of a bicycle illustrated is of ordinary construction and comprises the rear fork 1, rear or drive wheel 2, pedal or crank shaft 3, and drive-chain 4, the latter passing around sprocket-wheels on the rear axle and pedal-shaft in the usual manner for transmitting motion from the pedal-shaft to the drive-wheel. A plate 5 is secured by clips 6, or in any substantial manner, to the members of the rear fork 1, and is provided with stub-arms 7, in which is mounted a shaft 8, having the brake secured thereto, and provided with a sprocket-wheel 9, having an interposed clutch connection with its supporting-shaft, so as to admit of the sprocket-wheel rotating freely under normal conditions, and which on the application of back pressure upon the pedals will engage with the shaft 8 and turn it backward and apply the brake in the manner hereinafter to be more fully described.

The brake consists, essentially, of a frame comprising similar side pieces 10 of approximately semicircular form, an end roller 11, and an intermediate roller 12. The side pieces 10 are secured at their inner ends to the shaft 8, preferably by means of binding-screws 13, which admit of the shaft 8 being adjusted with reference to the machine-frame, so as to bring the gear elements 9 and 15 into line. An endless band 14 is mounted upon the rollers 11 and 12 and the portion of the shaft 8 coming between the side pieces 10, whereby in side elevation the brake approximates a D form, the flattened side of which is adapted to be brought forcibly into engagement with the tire of the drive-wheel 2 when setting the brake when it is required to check the speed of the machine. This endless band may be of any suitable material and is preferably of rubber or other elastic material, so as to yield and conform to the wheel and obviate injury to the tire thereof. By having the flattened side of the brake engage with the tire of the wheel a greater extent of surface is brought into contact therewith than would be possible by any other arrangement, and by having the flattened or straight portion unsupported intermediate of its ends it will yield and conform to the wheel, thereby securing the best results. The endless character of the band 14 enables it to turn or move with the wheel, thereby gradually or instantly stopping the machine, according to the back pressure applied, without injury to the tire. Moreover, by having the band 14 movable a new portion is brought into position to receive the wear, which is of vital consequence to the efficiency and durability of the brake.

A sprocket-wheel 15 is secured to the pedal-shaft 3, and a sprocket-chain 16 connects it with the sprocket-wheel 9, and when the machine is moving forward, either by gravitating down a grade or incline or by force applied to the pedals, the sprocket-wheel 9 will rotate upon the shaft 8, but upon back-pedaling the sprocket-wheel 9 will be positively turned in an inverse direction, and by reason of the clutch mechanism between it and the shaft 8 the latter will be turned backward in its bearings and set the brake in the manner set forth. Upon removing the back pressure from the pedals the sprocket-wheel 9 will be released and the brake will automatically fall away from the drive-wheel and permit the machine to move forward. Any suitable clutch mechanism may be interposed between the sprocket-wheel and the shaft 8, and, as shown, a ratchet-wheel 17 is secured to the shaft 8, and a series of pawls 18 have pivotal connection with the sprocket-wheel and move therewith, the teeth of the pawls and the ratchet-wheel being so arranged that in the forward movement of the sprocket-wheel the pawls 18 will ride over the ratchet-wheel, but upon turning the sprocket-wheel backward the pawls will interlock with the ratchet-wheel and turn the shaft and set the brake, as herein set forth.

Within the scope of the invention any form of brake or brake-shoe may be applied to the shaft 8, and in Fig. 6 is illustrated a spoon-shaped brake 19, having ears midway of its ends, by means of which it is mounted upon the roller or pin 11. This brake may be protected by an endless band 20 of rubber or other suitable material, if desired, or such covering may be omitted and the brake engage directly with the drive-wheel.

While it is preferred to have the sprocket-wheel 15 secured to the pedal-shaft, it may in some instances be attached directly to the crank on the same side of the machine with the sprocket-wheel 9, and such construction is illustrated in Fig. 7. This arrangement enables the machine to be constructed of a minimum tread and with a pedal-shaft of a minimum length, the sprocket-rim being secured by arms to the crank and overhanging the crank-hanger, as will be readily understood, whereby the ends mentioned are attained.

The sprocket-wheel 9ª, applied to the rear drive-wheel, is constructed substantially like the sprocket-wheel 9, to have a clutch connection therewith, whereby the machine may move forward under the acquired momentum when the pedals are held or reversed. This arrangement is necessary in order to permit the back-pedaling, so as to set the brake. The form of clutch between the drive-wheel and its sprocket-wheel is unimportant, so long as it will admit of the desired result being attained.

Having thus described the invention, what is claimed as new is—

1. In an automatic brake for bicycles and like machines, the combination with the drive-wheel, crank-axle, and connections between the drive-wheel and crank-axle embodying a clutch mechanism, whereby the machine may be impelled upon forward pedaling and the crank-axle may have its motion reversed or be held stationary without effecting the forward motion of the machine, of a shaft journaled in bearings parallel with the crank-axle, a brake secured upon an end portion of the shaft and normally held out of action when pedaling forward, gear elements applied to the said shaft and crank-axle, one of the said elements containing a clutch mechanism to permit of forward pedaling without setting the brake and to apply the brake upon back-pedaling, and means for connecting the said gear elements, substantially as described.

2. In an automatic brake for bicycles, &c., the combination of a shaft bearing a brake, sprocket-wheels applied to the crank and brake shafts, respectively, a sprocket-chain connecting the sprocket-wheels, an intermediate clutch mechanism for throwing the brake-shaft into active position upon the application of back pressure to the pedals and connections between the crank-axle and drive-wheel embodying a clutch mechanism, substantially as described.

3. In a brake mechanism for bicycles and the like, the combination with a ground-wheel, of a shaft, side pieces, means for adjustably connecting the shaft with reference to the side pieces, an end and a middle support, an endless band supported by the shaft and the end and middle supports, and means for turning the shaft in its bearing to set the brake, substantially as set forth.

4. In an automatic brake for bicycles, &c., the combination of a shaft, a brake secured to the shaft and disposed to automatically fall away from the drive-wheel, a gear-wheel mounted upon the said shaft and having clutched engagement therewith to cause the setting of the brake upon back-pedaling, a direct connection between the gear-wheel of the brake-shaft and the crank-shaft, and means for transmitting motion from the aforesaid shaft to the drive-wheel and embodying a clutch mechanism, substantially as and for the purpose set forth.

5. An automatic brake for bicycles, &c., comprising a plate having stub-arms, a shaft mounted in the said arms, curved side pieces secured to the shaft, an end and an intermediate support having connection with the side pieces, an endless band passing around the shaft and the said supports, a sprocket-wheel mounted upon the shaft and having a clutch engagement therewith to turn backward with the shaft and permit the shaft to turn forward independently thereof, means for imparting movement to the sprocket-wheel directly from the pedal-shaft and means for transmitting motion from the aforesaid shaft to the drive-wheel and embodying a clutch mechanism, substantially in the manner and for the purpose specified.

In testimony that I claim the foregoing as my own I have hereto affixed my signature in the presence of two witnesses.

CHARLES FREDERICK DINKLE.

Witnesses:
F. H. HOFFER,
H. W. CAUFMAN.